G. I. NEWBERRY.
SEED COLLECTOR DEVICE FOR MOWERS.
APPLICATION FILED FEB. 18, 1922.
1,429,294.  Patented Sept. 19, 1922.
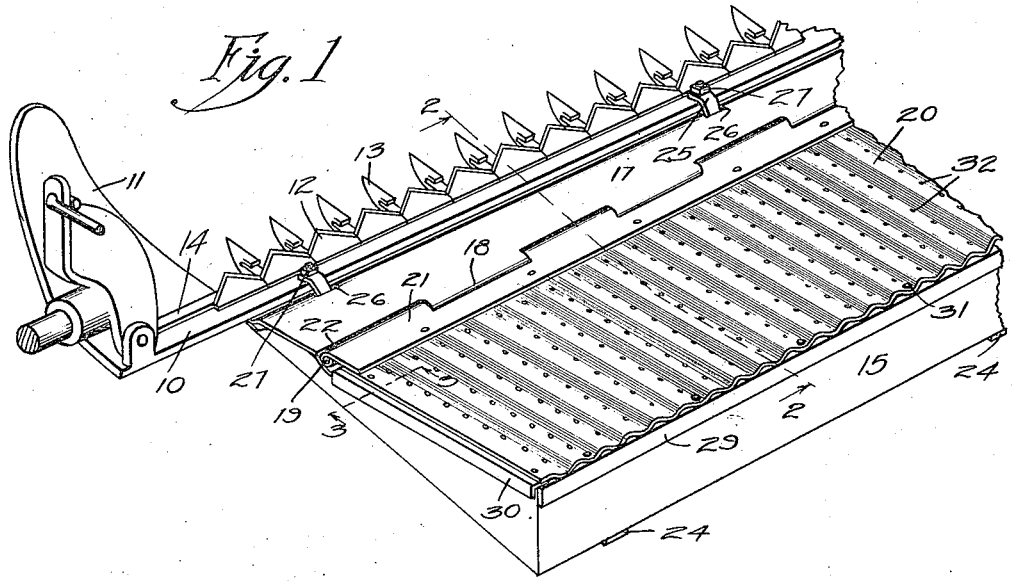
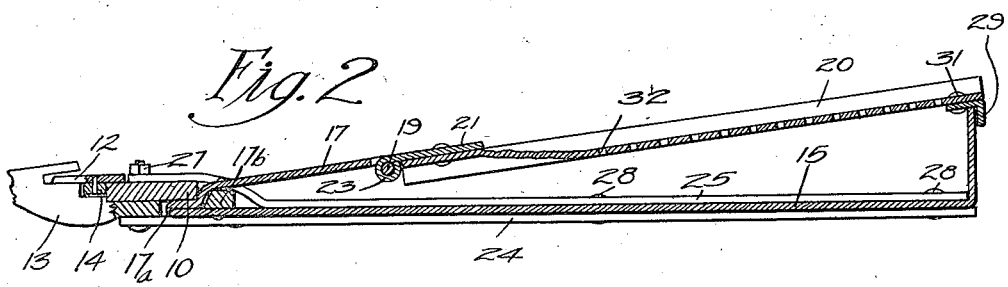
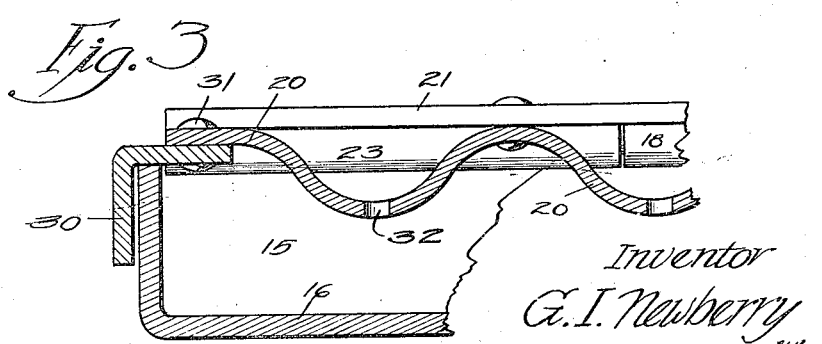
Witness
Lynn Latta
Inventor
G. I. Newberry
By Bair & Freeman
Atty Patented Sept. 19, 1922.

1,429,294

UNITED STATES PATENT OFFICE.

GEORGE I. NEWBERRY, OF FULTON, KENTUCKY.

SEED-COLLECTOR DEVICE FOR MOWERS.

Application filed February 18, 1922. Serial No. 537,485.

*To all whom it may concern:*

Be it known that I, GEORGE I. NEWBERRY, a citizen of the United States, and a resident of Fulton, in the county of Fulton and State of Kentucky, have invented a certain new and useful Seed-Collector Device for Mowers, of which the following is a specification.

The object of my invention is to provide a seed collector device for mowers, whereby the seed from falling grain may be collected and saved, the parts being of simple, durable and comparatively inexpensive construction.

Still another object is to provide a seed collecting pan, which is provided with a cover having corrugations therein, the raised portions of the corrugations serving to support the grain as it passes over the device, while the valleys of the corrugations are provided with a plurality of openings through which the seed from the falling grain may pass into the pan, the grain therefore not in anyway interfering with the seed.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of a mower with my improved seed collecting device attached thereto.

Figure 2 is a sectional view taken on the line 2—2 of Figure 1; and

Figure 3 is a detailed, enlarged, sectional view taken on the line 3—3 of Figure 1.

In the accompanying drawings, I have used the reference numeral 10 to indicate generally a finger bar, which is provided with a shoe 11. The cutting blades 12 and the guards 13 which are operated from the sickle bar 14 are of the ordinary construction.

My improved seed collecting device is secured to the rear edge of the finger bar 10, in the manner which will be hereinafter more fully described.

My device includes a wedge-shaped pan 15, having a bottom 16. The forward edge of the bottom 16 is folded over and bent back, so as to provide the portion 17. The free edge of the portion 17 is provided with tongues 18, which are bent over so as to provide loops for a pintle rod 19.

I provide a cover 20, which is corrugated, the corrugations running from front to rear. At the forward edge of the cover 20, I rivet a strip 21, having ears or tongues 22 formed thereon, which are bent over so as to provide loops 23. The loops 23 receive the pintle rod 19.

From the construction of the parts just described, it will be seen that the cover member 20 is hingedly connected to the portion 17 of the pan. Riveted to the bottom 16 of the pan 15 is a plurality of strips or bars 24. The bars 24 project forwardly from the forward edge of the pan and rest against the under side of the guards 13.

On the upper surface of the bottom 16 and within the pan 15, I provide corresponding bars 25, which extend through openings 26 formed in the forward edge of the pan, and are slightly curved at their forward ends, so as to rest upon the upper surface of the finger bar 10. The guards 13 are normally fixed to the bar 10 by means of bolts 27. In installing my improved seed pan, several of these bolts are removed and longer bolts substituted to pass through the bars 24 and 25 for fastening the pan to the bar 10. Thus the pan may be attached very quickly and easily without the necessity of drilling new holes. The strips 24 and 25 are riveted to the bottom 16 by means of the rivets 28.

It will be noted, by referring to Figure 2, that the rear edges of the guards terminate short of the rear edge of the bar 10. The forward edge of the pan 15 has a crimped or flattened portion $17^a$ designed to be received in the space behind the rear edges of the guards 13, between the bar 10 and the bars 24. The purpose of this is to prevent the loss of seed which falls on the finger bar.

A stiffening bar $17^b$, running transversely of the pan, is received between the portion 17 and the bottom of the pan adjacent to the crimped portion $17^a$, and is riveted to the pan for bracing the forward edge.

From the construction of the parts just described, it will be seen that the pan or seed collector is securely fastened to the mower directly in back of it.

The extreme rear edge of the cover 20 is provided with an angle bar strip 29, which has one of its sides resting against the outer surface of the back of the pan 15. On each of the side edges of the cover 20, I provide angle bar strips 30, which have one of their sides resting against the outer surface of the sides of the pan 15.

The angle bars 29 and 30 are riveted to the cover 20 by means of the rivets 31.

In the grooves or valleys of the corrugated top 20, I provide a plurality of openings 32, through which the seed may pass for being received in the pan 15.

In this connection, it may be mentioned that when the grain is cut by the mower, the grain will fall upon the cover 20 and any seed, which may become loosened from the grain will immediately be passed into the valleys or grooves of the corrugated top 20.

The seed will then pass through the openings 32 into the pan 15. The grain and straw of the grain will ride and rest upon the raised portions of the corrugations, thereby not interfering with the seed, which has become severed from the grain.

One of the advantages of my device is the fact that the grain, which is continually being moved, due to the advancing movement of the mower, will not in anyway interfere with the seed from being properly collected, due to the fact that the grain rides upon the raised portions of the corrugated top 20.

Some changes may be made in the construction and arrangement of the various parts of my device, without departing from the essential features and purposes of my invention, and it is my intention to cover by my claim, any modified forms of structure, or use of mechanical equivalents, which may be reasonably included within its scope.

I claim as my invention:

A seed collecting device for mowing machines comprising a pan provided with means to enable it to be fastened to the rear edge of the finger bar thereof, and having a hinged cover therefor, said pan having its forward edge flattened to be received below the rear edge of the finger bar for closing any gap between it and the finger bar, said cover being provided with corrugations, the corrugations running from front to rear, the valley of the corrugations being provided with a plurality of openings for permitting seed falling from the grain to pass through said openings into said pan while the straw of the grain will slide over the upper portion of the corrugations without interfering with the seed in valleys of the corrugations, all for the purposes stated.

Des Moines, Iowa, January 20, 1922.

GEORGE I. NEWBERRY.